(12) United States Patent
Norikane et al.

(10) Patent No.: US 8,568,628 B2
(45) Date of Patent: Oct. 29, 2013

(54) TONER PREPARATION METHOD AND APPARATUS, AND TONER PREPARED THEREBY

(75) Inventors: Yoshihiro Norikane, Yokohama (JP); Shinji Ohtani, Shizoka-ken (JP); Yohichiroh Watanabe, Fuji (JP); Kazumi Suzuki, Shizoka-ken (JP); Takahiro Honda, Fujinomiya (JP)

(73) Assignee: Ricoh Company, Ltd., Tokyo (JP)

( * ) Notice: Subject to any disclaimer, the term of this patent is extended or adjusted under 35 U.S.C. 154(b) by 1172 days.

(21) Appl. No.: 12/120,379

(22) Filed: May 14, 2008

(65) Prior Publication Data

US 2008/0286679 A1    Nov. 20, 2008

(30) Foreign Application Priority Data

May 16, 2007    (JP) .................. 2007-130295

(51) Int. Cl.
*G03G 9/087* (2006.01)
*B29B 9/10* (2006.01)

(52) U.S. Cl.
USPC .............. 264/13; 430/110.3; 430/137.19; 425/6; 425/10

(58) Field of Classification Search
USPC ............ 425/6–7, 10; 264/9, 10, 12, 13; 430/110.3, 437.1, 137.19
See application file for complete search history.

(56) References Cited

U.S. PATENT DOCUMENTS

| | | | | |
|---|---|---|---|---|
| 4,871,489 A | * | 10/1989 | Ketcham | 425/6 |
| 6,499,979 B2 | * | 12/2002 | Northup et al. | 425/6 |
| 6,852,463 B2 | * | 2/2005 | Teshima | 425/6 |
| 7,709,175 B2 | * | 5/2010 | Ohtani | 430/137.1 |
| 8,034,526 B2 | * | 10/2011 | Watanabe et al. | 430/137.1 |
| 2003/0224271 A1 | | 12/2003 | Teshima | |
| 2006/0210909 A1 | | 9/2006 | Ohtani | |
| 2006/0240354 A1 | | 10/2006 | Ohtani | |
| 2007/0075161 A1 | | 4/2007 | Ivri | |
| 2008/0063971 A1 | | 3/2008 | Watanabe et al. | |

FOREIGN PATENT DOCUMENTS

| | | |
|---|---|---|
| EP | 1344562 A2 | 9/2003 |
| EP | 1703332 A2 | 9/2006 |
| JP | 57-201248 | 12/1982 |
| JP | 7-152202 | 6/1995 |
| JP | 3786034 | 3/2006 |
| JP | 3786035 | 3/2006 |
| JP | 2006-293320 | 10/2006 |
| JP | 2006-301427 | 11/2006 |

OTHER PUBLICATIONS

Apr. 19, 2011 Chinese official action in connection with a counterpart Chinese patent application.

(Continued)

*Primary Examiner* — Richard Crispino
*Assistant Examiner* — Thukhanh Nguyen
(74) *Attorney, Agent, or Firm* — Cooper & Dunham LLP

(57) ABSTRACT

A method of preparing a toner, including periodically dripping and discharging droplets of a toner constituent liquid comprising a resin and a colorant with a dripper comprising a thin film comprising plural nozzles configured to discharge the droplets, and an electromechanical converter configured to oscillate the thin film; and solidifying the droplets to form toner particles, wherein the nozzle has an aperture discharging the droplet, having a circular or an ellipsoidal cross-sectional shape and cross-sectional area smaller than a cross-sectional area of another aperture contacting the toner constituent liquid.

13 Claims, 8 Drawing Sheets

(56) References Cited

OTHER PUBLICATIONS

Jun. 24, 2009 European search report in connection with a counterpart European patent application No. 08 25 1696.

Jan. 19, 2010 European official action in connection with counterpart European patent application No. 08 251 696.

May 11, 2012 Japanese office action of the Japanese Patent Office for Japanese patent application No. 2007-130295.

* cited by examiner

TONER PREPARATION METHOD AND APPARATUS, AND TONER PREPARED THEREBY

BACKGROUND OF THE INVENTION

1. Field of the Invention

The present invention relates to a method and an apparatus for preparing a toner used as developer developing electrostatic latent images in electrophotography, electrostatic recording and electrostatic printing, and a toner prepared thereby; and more particularly to improvement of uniform particle diameter dispersibility of the toner and productivity thereof.

2. Discussion of the Related Art

Developers for use in electrophotography, electrostatic recording and electrostatic printing, in their developing processes, are transferred to image bearers such as photoreceptors electrostatic latent images are formed on, transferred therefrom to a transfer medium such as a transfer paper, and fixed thereon. As the developers for developing electrostatic latent images formed on image bearers, a two-component developer including a carrier and a toner, and a one-component developer without a carrier, such as a magnetic toner and a nonmagnetic toner, are known.

Conventionally, as a dry toner for use in electrophotography, electrostatic recording and electrostatic printing, a pulverized toner is widely used, which is formed by kneading a toner binder such as styrene resins and polyester resins with a colorant, etc. upon application of heat, cooling the kneaded mixture to be solidified and pulverizing the solidified mixture.

Recently, polymerized toners prepared by suspension polymerization methods, emulsion polymerization condensation methods, etc. are being used. Besides, Japanese published unexamined application No. 7-152202 discloses a polymer solution suspension method of using a volume contraction. This method includes dispersing or dissolving toner constituents in a volatile solvent such as an organic solvent having a low boiling point to prepare a dispersion or a solution, emulsifying the dispersion or solution in an aqueous medium to form a droplet, and removing the volatile solvent. The diversity of resins this method can use is wider than those of the suspension polymerization methods and emulsion polymerization condensation methods, and has an advantage of being capable of using a polyester resin effectively used for full-color images requiring transparency and smoothness.

However, in the polymerization methods, since a dispersant is basically used in an aqueous medium, the dispersant impairing the chargeability of a toner remains on the surface thereof, resulting in deterioration of environmental resistance. In addition, a large amount of water is needed to remove the dispersant, resulting in unsatisfactory methods of preparing a toner.

Japanese published unexamined application No. 57-201248 discloses a spray dry method having been known from long ago as a method of preparing a toner without using an aqueous medium. This atomizes and discharges a toner constituent solution or a toner constituent liquid with various atomizers, and dries to form particles. Therefore, this does not have problems o using an aqueous medium. However, particles prepared by the conventional spray granulation methods are coarse and large, and have a wide particle diameter distribution, resulting in deterioration of toner properties themselves.

Japanese Patent No. 3786034 discloses a method and an apparatus forming a microscopic droplet of a toner constituent with a piezoelectric pulse, and drying and solidifying the microscopic droplet to form a toner. Further, Japanese Patent No. 3786035 discloses a method of forming a microscopic droplet thereof with a heat expansion in a nozzle, and drying and solidifying the microscopic droplet to form a toner.

A method disclosed in Japanese published unexamined application No. 2006-293320 is that a nozzle is oscillated by expansion and contraction of a piezoelectric body as an oscillator to discharge a toner constituent fluid droplet at a constant frequency, and that the droplet is solidified to from a toner.

In the methods disclosed in Japanese Patents Nos. 3786034 and 3786035, and Japanese published unexamined application No. 2006-293320, since the toner constituent has high viscosity and includes particulate materials, the toner constituent adheres to a circumference of the nozzle discharging a microscopic droplet to downsize its diameter and frequently clog the nozzle.

Nozzles of civilian goods such as an inkjet recorder are typically subjected to a periodical maintenance to prevent the nozzles from being clogged or clear the nozzle. However, it is impossible to stop the operation to subject the nozzles for preparing a large amount of a microscopic powder such as a toner to maintenance every time when clogged in terms productivity. In addition, the nozzles discharging a toner constituent having high viscosity are much more frequently clogged than those of the inkjet recorders.

Further, a number of nozzles need to be located on a reservoir of the toner constituents to prepare a large amount of a toner. When a part of the nozzles is clogged, the sprayability of the other nozzles are adversely affected, resulting in uneven particle sizes of the resultant toner.

Because of these reasons, a need exists for a method of stably preparing a toner having a uniform particle size.

SUMMARY OF THE INVENTION

Accordingly, an object of the present invention is to provide a method of stably preparing a toner having a uniform particle size.

Another object of the present invention is to provide an apparatus stably preparing a toner having a uniform particle size using the method.

A further object of the present invention is to provide a toner prepared by the method.

To achieve such objects, the present invention contemplates the provision of a method of preparing a toner, comprising:

periodically dripping and discharging droplets of a toner constituent liquid comprising a resin and a colorant with a dripper, comprising:
 a thin film comprising plural nozzles configured to discharge the droplets, and
 an electromechanical converter configured to oscillate the thin film; and
solidifying the droplets to form toner particles,
wherein the nozzle has an aperture discharging the droplet, having a circular or an ellipsoidal cross-sectional shape and cross-sectional area smaller than a cross-sectional area of another aperture contacting the toner constituent liquid.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Generally, the present invention provides a method of stably preparing a toner having a uniform particle size. More particularly, the present invention relates to a method of preparing a toner, comprising:

periodically dripping and discharging droplets of a toner constituent liquid comprising a resin and a colorant with a dripper, comprising:

a thin film comprising plural nozzles configured to discharge the droplets, and an electromechanical converter configured to oscillate the thin film; and solidifying the droplets to form toner particles, wherein the nozzle has an aperture discharging the droplet, having a circular or an ellipsoidal cross-sectional shape and cross-sectional area smaller than a cross-sectional area of another aperture contacting the toner constituent liquid.

Figure 1:
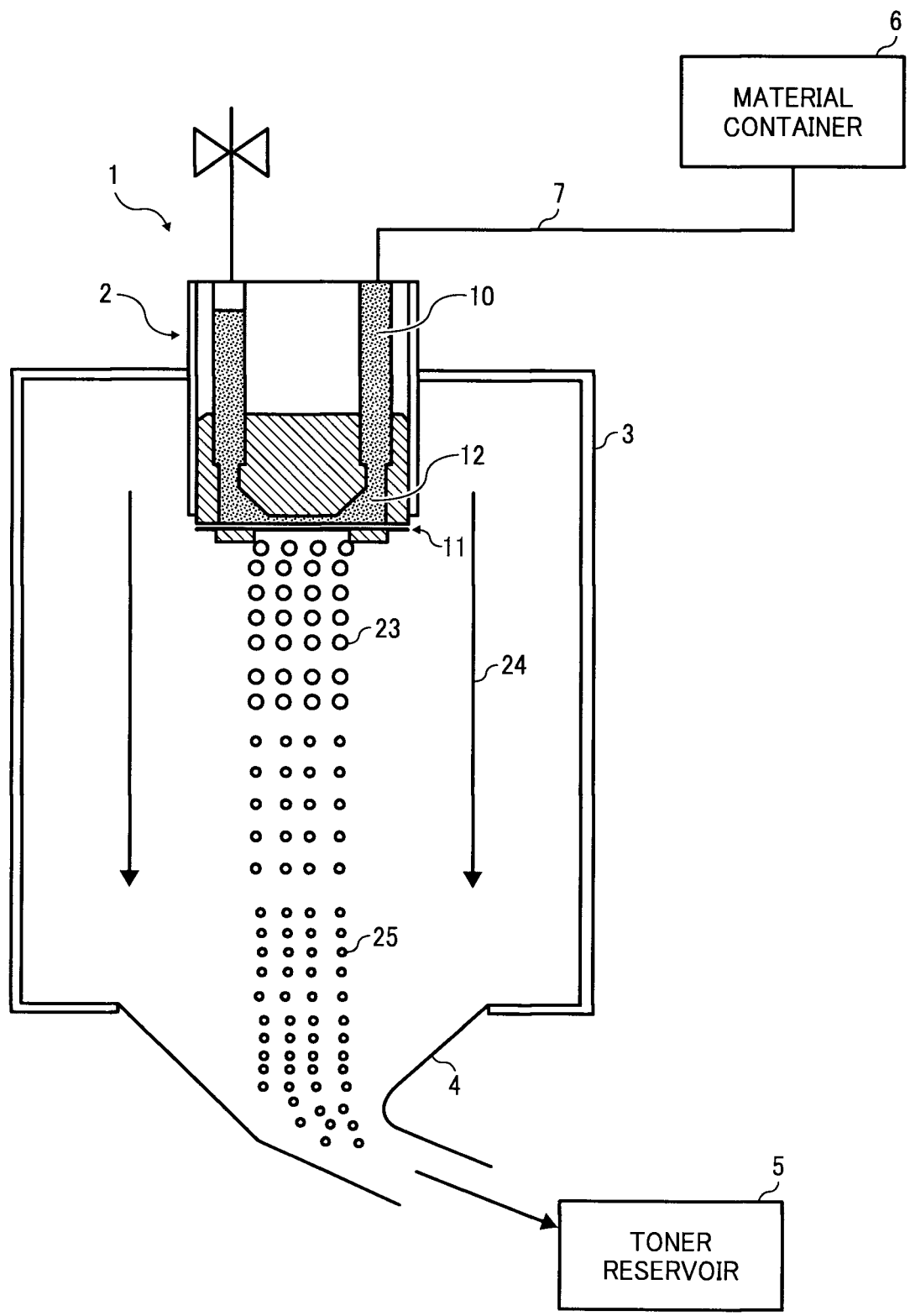
FIG. 1 is a schematic view illustrating the apparatus for preparing a toner of the present invention.

FIG. 1 is a schematic view illustrating the apparatus for preparing a toner of the present invention. The toner preparation apparatus 1 includes a droplet spray unit 2 including a dripper and a reservoir, a particle former 3 solidifying a droplet of a toner constituent liquid discharged from the droplet spray unit 2 to form toner particles therebelow, a toner collector 4 collecting the toner particles T formed in the particle former 3, a toner reservoir 5 reserving the toner particles T, a material container 6 containing the toner constituent liquid, and a piping 7 having a feed pump 71 feeding the toner constituent liquid contained in the material container 6 to the droplet spray unit 2.

Figure 2:
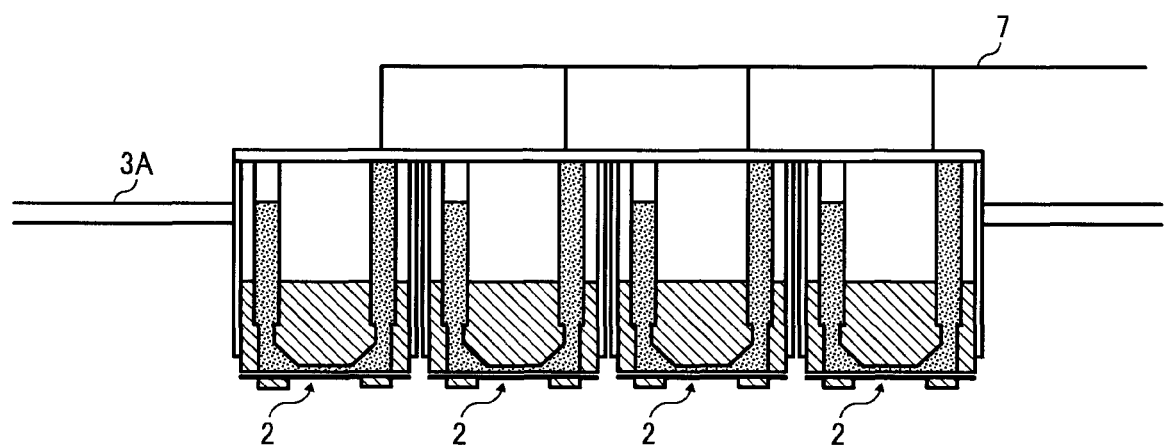
FIG. 2 is a schematic view illustrating a location of the droplet spray units of the present invention.

FIG. 1 has only one droplet spray unit 2, however, plural, e.g., 100 to 1,000 droplet spray units 2 are preferably located in line at an upper surface 3A of a drying tower forming the particle former 3 as shown in FIG. 2. The toner constituent liquid is fed to each of the droplet spray units 2 through the piping 7 connected to the material container 6. The toner constituent liquid is automatically fed to the droplet spray units 2 while dripping, and may be fed thereto by an auxiliary pump 71.

Figure 3:
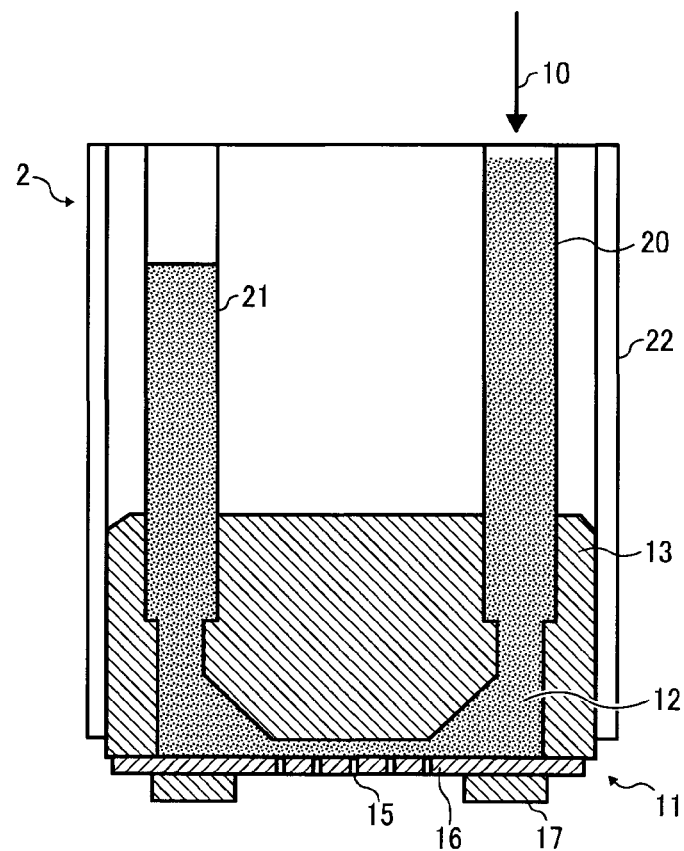
FIG. 3 is a side cross-sectional view illustrating a structure of the droplet spray units of the present invention.
Figure 4:
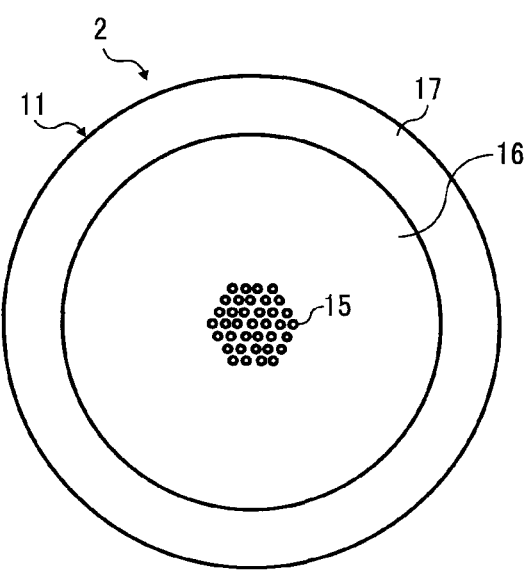
FIG. 4 is bottom view of the droplet spray units of the present invention.

The droplet spray unit 2, as shown in FIGS. 3 and 4, includes a dripper 11 dripping and discharging a toner constituent liquid 10, wherein a toner constituent including at least a resin and a colorant is dispersed or dissolved, and a flow path member 13 including a liquid flow path 12 feeding the toner constituent liquid 10 to the dripper 11.

The dripper 11 includes a thin film 16 including plural nozzles 15 and facing the liquid flow path 12 on a flow path member 13, and a circular ring-shaped electromechanical converter 17 located on the circumference of the thin film 16 as a mechanical oscillator oscillating the thin film 16. The thin film 16 is bonded to the flow path member 13 with a solder or a binder resin insoluble in the toner constituent liquid 10. The circular ring-shaped electromechanical converter 17 is bonded to the thin film 16 with a solder or a binder resin insoluble in the toner constituent liquid 10 as well. A drive voltage is applied to the electromechanical converter 17 from a drive circuit (not shown) through a lead wire.

Figure 5:
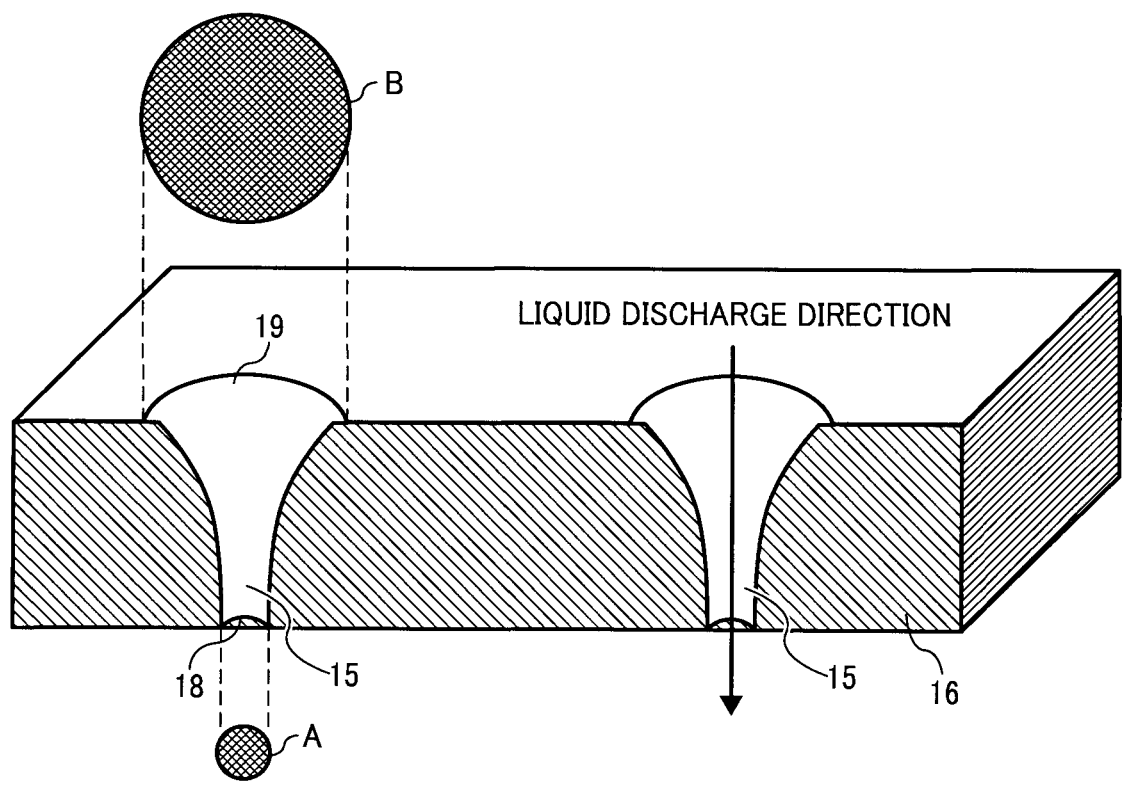
FIG. 5 is a partial cross-sectional view illustrating a shape of the nozzle of the present invention.
Figure 6A:
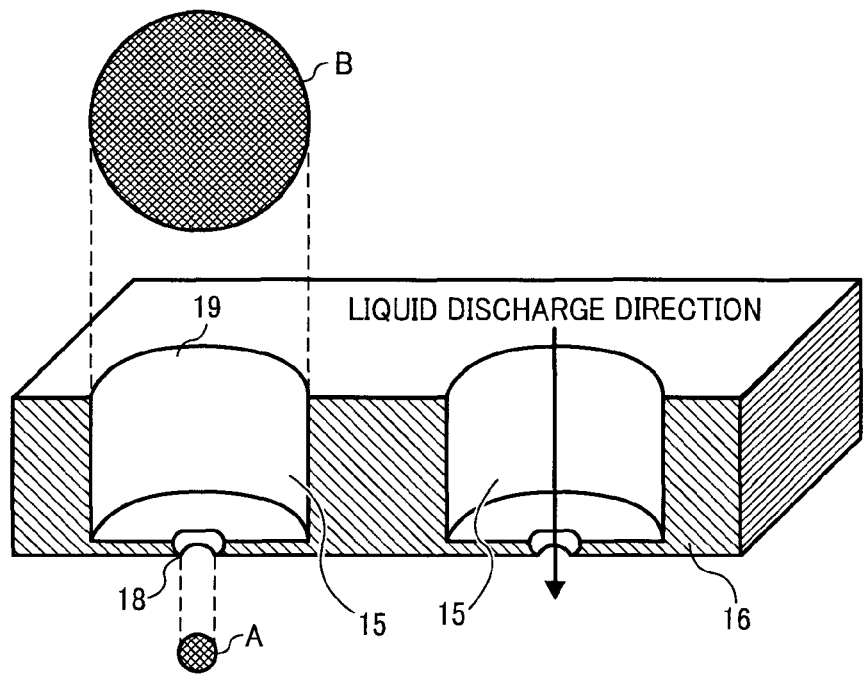
FIGS. 6 (a) and 6 (b) are partial cross-sectional views illustrating other shapes of the nozzle of the present invention.
Figure 6B:
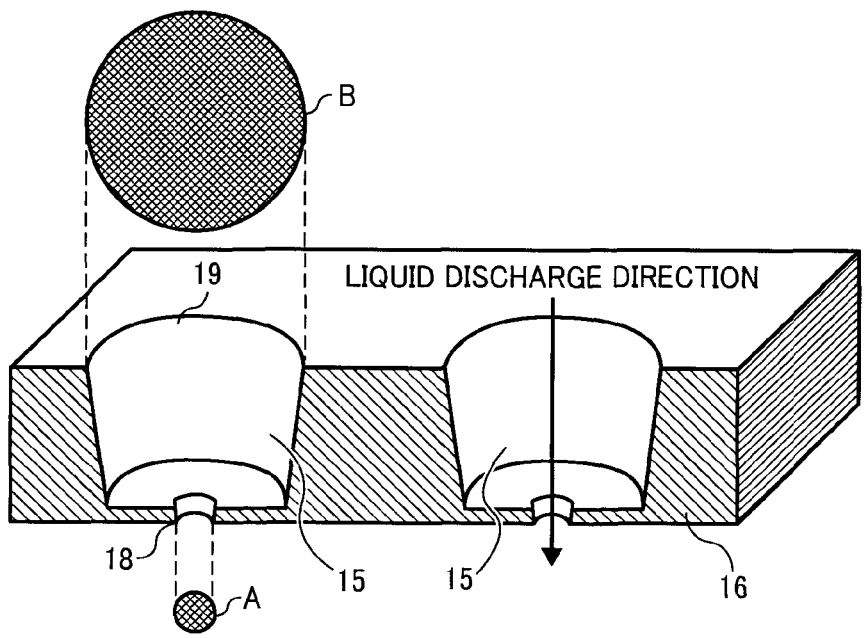

The thin film 16 is formed of a metallic plate having a thickness of from 5 to 500 μm. A nozzle 15 formed thereon, as shown in FIG. 5, has a liquid discharge aperture 18 having a cross-sectional area A smaller than a cross-sectional area B of an aperture contacting the liquid level 19, and is preferably tapered from the aperture contacting the liquid level 19 toward the liquid discharge aperture 18. This is for the toner constituent liquid 10 to discharge without stagnation so as not to clog the nozzle with solid particulate materials. As shown in FIGS. 6 (a) and 6 (b), the nozzle 15 can have the shape of a double-deck cylinder or cone because of having less fluid resistivity, which is suitable for discharging the toner constituent liquid 10 having high viscosity. The toner constituent liquid 10 includes particulate materials such as an organic pigment, an inorganic pigment and a release agent having an average particle diameter of from 100 to 200 nm. In order to prevent the nozzle 15 from being clogged with the particulate materials, the liquid discharge aperture 18 preferably has a diameter not less than 10 times as large as the average particle diameter of the particulate materials, i.e., not less than 2 μm. A Pitch between the nozzles 15 preferably has a length not less than 3 times as long as a diameter of the liquid discharge aperture 18 to prevent the droplets from being combined after discharged. The aperture diameter of the nozzle 15 is a diameter when a true circle and a minor axis when an ellipse. The number of the plural nozzles is preferably from 2 to 3,000.

The electromechanical converter 17 is not particularly limited, provided it can oscillate the thin film 16 at a constant frequency, and preferably, e.g., a bimorph piezoelectric body exciting a flexural oscillation. Specific examples of the piezoelectric body include piezoelectric ceramics such as lead zirconate titanate (LZT). The piezoelectric ceramics are typically layered because of having a small displacement. Besides, piezoelectric polymers such as polyvinylidenefluoride (PVDF) and single crystals such as quartz, $LiNbO_3$, $LiTaO_3$ and $KNbO_3$ are preferably used.

Each of a liquid feeding tube 20 feeding the toner constituent liquid 10 to a reservoir (the liquid flow path) 12 and an air bubble discharge tube 21 discharging air bubbles is connected to at least a part of the flow path member 13. The droplet spray unit 2 is located at the upper surface 3A of the drying tower forming the particle former 3. The droplet spray unit 2 may be located on the side surface or at the bottom thereof.

Figure 7A:
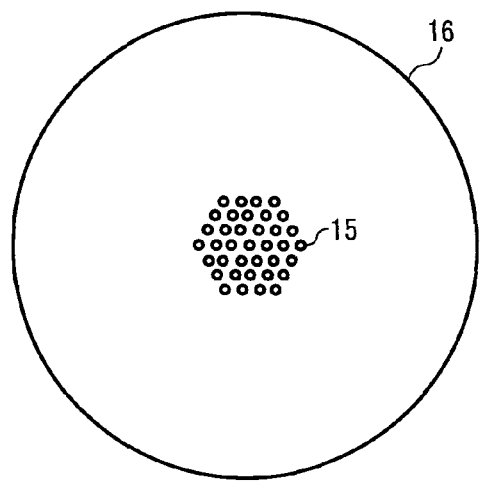
FIGS. 7 (a) and 7 (b) are schematic views illustrating nozzles formed on a thin film of the present invention and an oscillation status thereof, respectively.
Figure 7B:
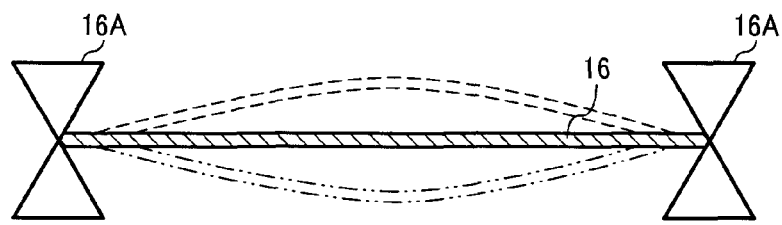
Figure 8:
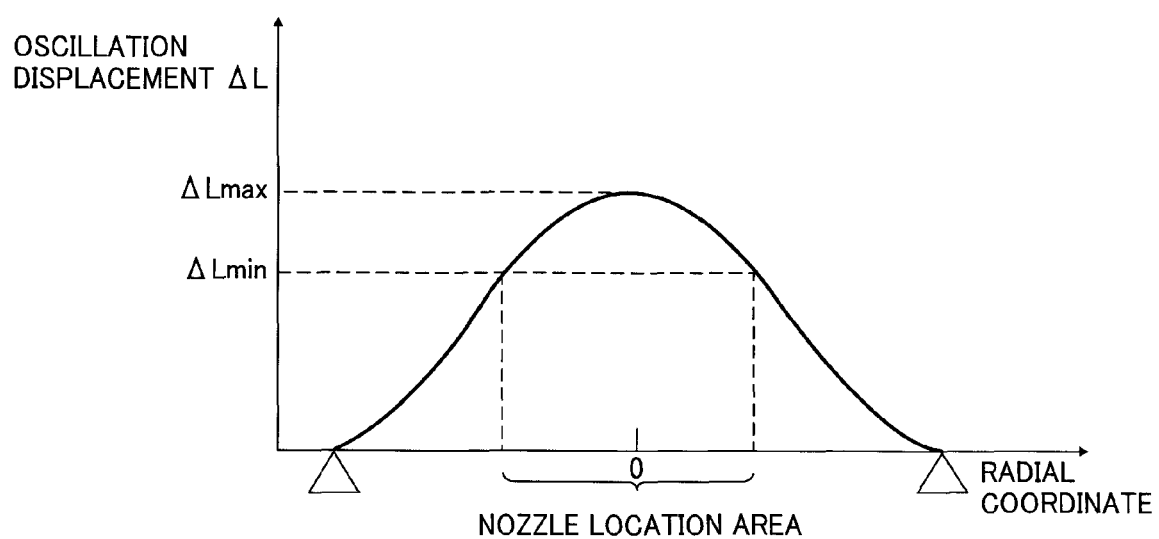
FIG. 8 is a waveform chart showing the oscillation status of the thin film of the present invention.
Figure 9A:
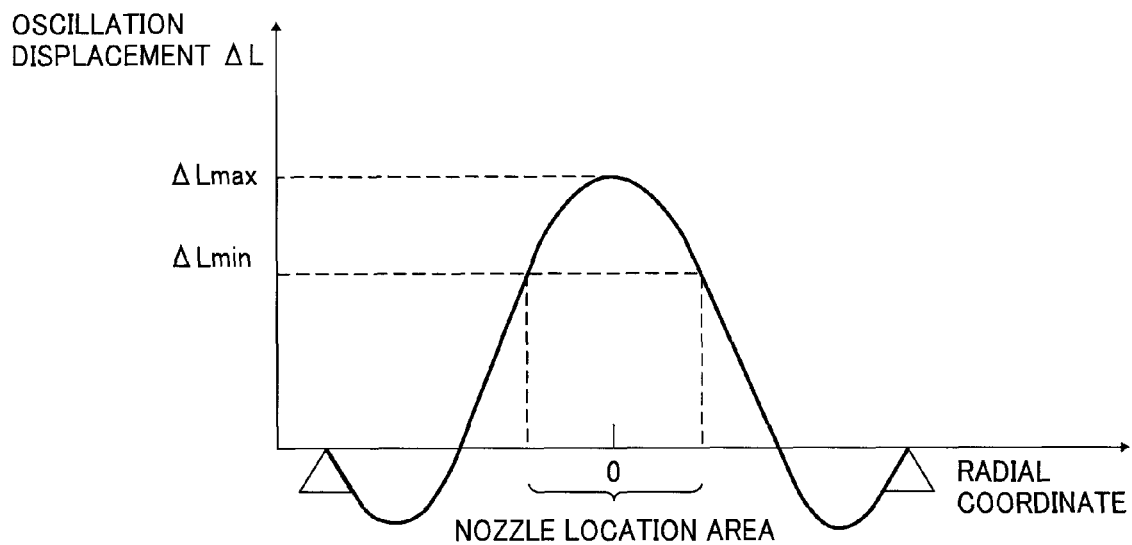
FIGS. 9 (a) and 9 (b) are waveform charts showing other oscillation statuses of the thin film of the present invention.
Figure 9B:
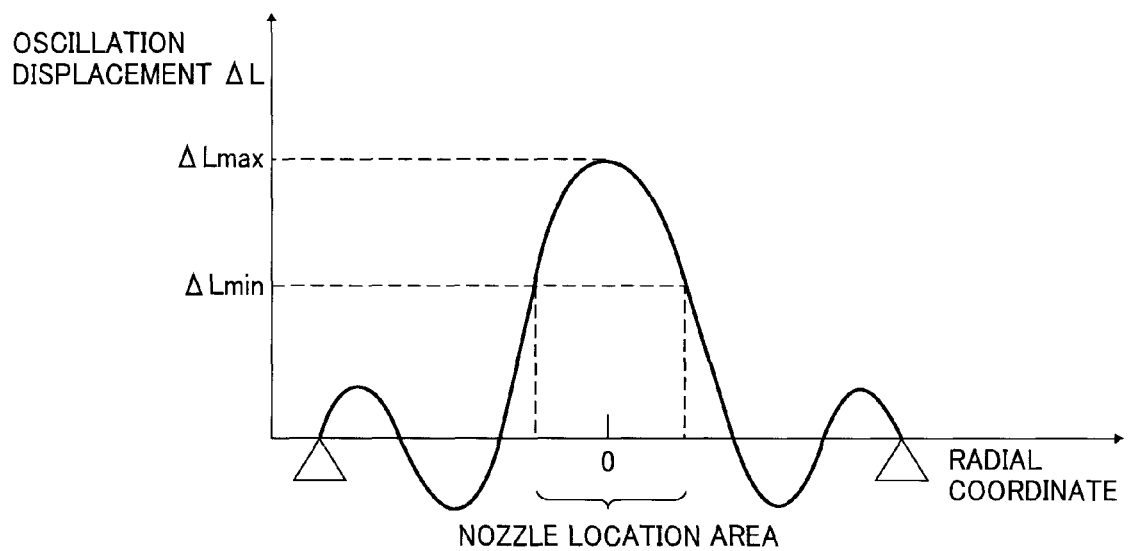
Figure 10:
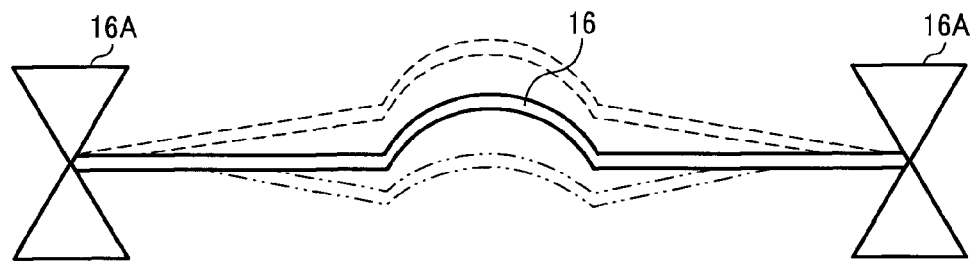
FIG. 10 is a schematic view illustrating another shape of the thin film of the present invention.

A droplet forming mechanism by the dripper 11 will be explained, referring to FIG. 7. The dripper 11 oscillates the thin film 16 with an electromechanical converter 17 as a mechanical oscillator formed in the shape of a ring along the circumference of to the thin film 16. Plural nozzles 15 are located in comparatively a large area having a diameter not less than 1 mm on the thin film 16 and droplets are stably formed and discharged from the plural nozzles 15. When a simple circular thin film 16 having a fixed circumference 16A of as shown in FIGS. 7(a) and 7(b) is oscillated, a basic oscillation has a displacement ΔL becoming maximum (ΔLmax) at the center of the circular thin film 16 as shown in FIG. 8 while the circumference is a joint and the thin film 16 periodically oscillates up and down. Therefore, as shown in FIG. 8, the circular thin film 16 preferably oscillates having the circumference being a joint without a joint diametrically. As shown in FIGS. 9 (a) and 9 (b), higher oscillation modes are known when oscillating the circular thin film 16. These modes concentrically have one or plural joints in a circular thin film 16 and substantially has a symmetric deformed configuration in the radial direction. In addition, as shown in FIG. 10, when the circular thin film 16 has a convex center, a traveling direction of the droplet and the amplitude can be controlled.

When the circular thin film 16 oscillates, the toner constituent liquid 10 close to the plural nozzles 15 formed on the circular thin film 16 has a pressure Pa proportional to an oscillation speed Vm of the circular thin film 16. A sound pressure is known to generate as a radiation impedance Zr of a medium toner constituent liquid 10, and the pressure is determined by the following formula:

$$Pa(r,t) = Zr \cdot Vm(r,t) \qquad (1).$$

The oscillation speed Vm of the thin film 16 is a function of time t because of periodically varying with time, and can form various periodical variations such as a sine waveform and a rectangle waveform. In addition, as mentioned above, every part of the thin film 16 has a different oscillation displacement and the oscillation speed Vm is also a function of a position coordinate on the thin film 16. An oscillation form of the thin film 16 is preferably a symmetric deformed configuration in the radial direction as mentioned above, and substantially a function of a radius r.

Figure 11A:
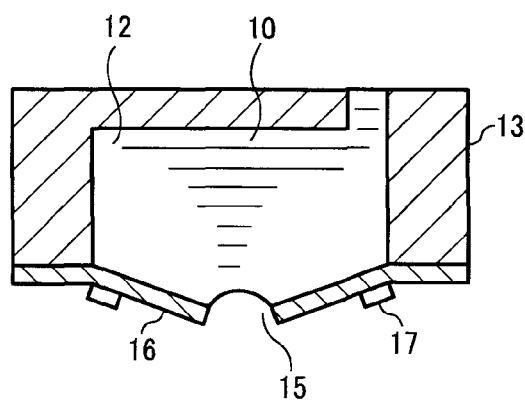
FIGS. 11 (a) and 11 (b) are schematic views illustrating the nozzle oscillating a thin plate to discharge a droplet in the present invention.
Figure 11B:
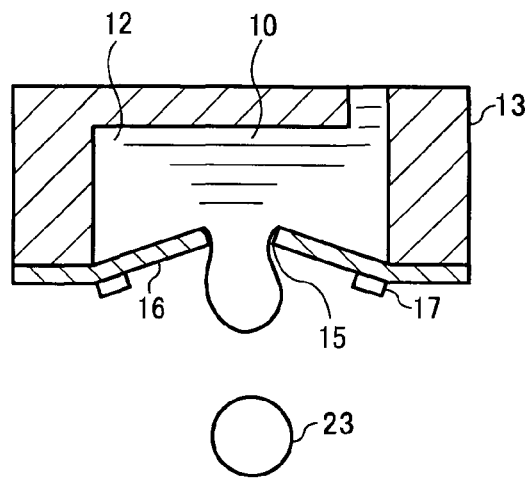

As mentioned above, a pressure proportional to an oscillation displacement speed having a distribution of the thin film 16 is generated and the toner constituent liquid 10 is discharged to a gas phase in accordance with a periodical change of the pressure. Since the toner constituent liquid 10 periodically discharged to the gas phase becomes spherical due to a difference of surface tensions between the liquid phase and the gas phase, the toner constituent liquid 10 is periodically dripped and discharged from the plural nozzles 15. FIGS. 11 (a) and 11 (b) are schematic views illustrating the nozzle oscillating a thin film to discharge a droplet in the present invention. When a flexural oscillation is applied to the electromechanical converter 17 located along the circumference of the thin film 16, the thin film 16 oscillates bowing in the opposite direction of a reservoir 12 as shown in FIG. 11 (a) and in the direction thereof as shown in FIG. 11 (b). Thereby, the thin film 16 oscillates to drip the toner constituent liquid 10 and discharge a droplet 23.

The thin film 16 preferably has an oscillation frequency of from 20 kHz to 2.0 MHz, and more preferably from 50 to 500 kHz. The oscillation frequency not less than 20 kHz accelerates dispersion of a pigment and a wax in the toner constituent liquid 10. The dispersion of a pigment and a wax is more preferably accelerated when the toner constituent liquid 10 has a pressure not less than 10 kPa. The droplet has a larger diameter as the oscillation displacement in an area where the plural nozzles 15 of the thin film 16 are formed becomes larger. When the oscillation displacement is small, a small droplet is formed or the toner constituent liquid 10 is not dripped. In order to reduce variation of the droplet sizes in an area where the plural nozzles 15 are formed, the plural nozzles 15 need to be located such that the thin film 16 has the most suitable oscillation displacement.

According to an experiment, when the plural nozzles 15 are located such that the oscillation of the thin film 16 the electromechanical converter 17 generates in FIG. 8 or 9 has a ratio R (ΔLmax/ΔLmin) of a maximum (ΔLmax) to a minimum (ΔLmin) of the oscillation direction displacement not greater than 2.0 in an area the plural nozzles are formed, i.e., when the plural nozzles 15 are located in an area where R is not greater than 2.0, the droplet size variation can be in a range of toner particle sizes required to produce high-quality images.

Further, satellite particles having a diameter about one tenth of that of the droplets mainly formed cause the droplet size variation. When the sound pressure is greater than 500 kPa, many satellite particles are generated. Meanwhile, when the toner constituent liquid has a viscosity not greater than 20 mPa·s and surface tension of from 20 to 75 mN/m, a satellite generates. Therefore, the toner constituent liquid 10 preferably has a sound pressure of from 10 kPa to 500 kPa, and more preferably from 10 kPa to 100 kPa to prevent the satellite particles from generating.

Next, an outline of the process of preparing a toner in the toner preparation apparatus 1 will be explained. The toner constituent liquid 10 including at least a resin and a colorant is fed into the reservoir 12 of the droplet spray unit 2. A drive waveform having a required drive frequency is applied to the electromechanical converter 17 of the dripper 11 to have a flexural oscillation. The flexural oscillation of the electromechanical converter 17 periodically oscillates the thin film 16. As shown in FIG. 1, the oscillation of the thin film 16 periodically drip and discharge the toner constituent liquid 10 as a droplet 23 from the plural nozzles 15 into the particle former 3 as a solvent remover. Having the plural nozzles 15, the dripper 11 of the droplet spray unit 2 continuously discharges a number of the droplets 23 of the toner constituent liquid 10. Therefore, the toner preparation efficiency is more noticeably improved than that of toner preparation methods using conventional liquid discharge heads.

The particle former 3 transports the droplet 23 discharged with a dry gas 24 streaming in the same direction as the dropping direction of the droplet 23 in the particle former 3 to remove the solvent therefrom and form a toner particle 25. The dry gas 24 has a dew point not higher than −10° C. at atmospheric pressure. The dry gas 24 may be any gas capable of dying the droplet 23, such as air and nitrogen. The toner particle 25 formed in the particle former 3 is collected by the toner collector 4 on the downstream side and is retained in the toner reservoir 5 through a tube (not shown). The toner collector 4 has a cross-sectional shape having a tapered surface gradually shrinking from the entrance (droplet spray unit 2 side) to the exit. The toner particle 25 is transferred by a current of the dry gas 24 from an exit of the toner collector 4 to the toner reservoir 5. The toner particle 25 can be transferred from the toner collector 4 to the toner reservoir 5 with a pressure or suctioned thereby. The stream of the dry gas 24 is preferably a swirling current in terms of stably transferring the toner particle 25 with a centrifugal force. The toner collector 4, the tube (not shown) and the toner reservoir 5 are preferably formed of electroconductive materials and earthed. Further, the toner preparation apparatus 1 is preferably an explosion-proof apparatus. An entrance of the toner collector 4 has a discharger 41 temporarily neutralizing a charge of the toner particle 25 formed in the particle former 3 to prevent the toner particle 25 from adhering to the surface of the toner collector 4. As the discharger 41, a soft X-ray irradiator irradiating the toner particle 25 with a soft X-ray or a plasma irradiator irradiating the toner particle 25 with plasma can be used.

In addition, the droplet 23 of the toner constituent liquid 10 may be dried by a cooler to form the toner particle 25. Further, the droplet 23 of the toner constituent liquid 10 may be passed through a feed path to form the toner particle 25, a charge thereof be temporarily neutralized by a discharger and the toner particle 25 be collected by the toner collector 4. The toner particle is discharged with a soft X-ray irradiation or a plasma irradiation.

Thus, the droplet spray unit 2 including the thin film 16 the plural nozzles 15 are formed on and the circular ring-shaped electromechanical converter 17 oscillating the thin film 16, located on the circumference thereof drips and discharges the toner constituent liquid 10. Therefore, the toner particles 25 having more uniform particle diameter than ever are efficiently prepared. In addition, the liquid discharge aperture 18 having a cross-sectional area A smaller than a cross-sectional area B of the aperture contacting the liquid level 19 and ten times as large as an average particle diameter of solid dispersed particles in the toner constituent liquid 10 can stably and continuously discharge the toner constituent liquid 10 having high-viscosity and including solid particles.

Next, the toner of the present invention will be explained. The toner is prepared by the above-mentioned method using the above-mentioned apparatus 1, which has a sharp particle diameter distribution. Specifically, the toner preferably has a ratio of a weight-average particle diameter to a number-average particle diameter thereof of from 1.00 to 1.05. In addition, the toner preferably has the weight-average particle diameter of from 1 to 20 μm. The toner of the present invention can easily be re-dispersed, i.e., floated due to electrostatic repulsion. Therefore, the toner can easily be transported to a developing area without conventional transport means. Namely, the toner can be transported even by an imperceptible airflow and a simple air pump can transport the toner to a developing area to be developed. An electrostatic latent image can be developed by so-called a power cloud development in quite good conditions without image forming disorder. In addition, the toner of the present invention can be used for conventional developing methods without problems. Carriers and members such as a developing sleeve are simply used as toner transporters, and do not need to have friction chargeability. Therefore, many other materials can be used therefor and durability thereof can largely be improved. In addition, more inexpensive materials can be used to reduce cost.

Next, the toner materials (toner constituent liquid 10) for use in the present invention will be explained.

Conventional toner materials for electrophotography can be used. Namely, a toner binder such as a styrene-acrylic resin, a polyester resin, a polyol resin and an epoxy resin is dissolved in an organic solvent to prepare a solution, and a colorant and a release agent is dispersed or dissolved therein to prepare a toner constituent liquid. Then, the toner constituent liquid is finely dripped, dried and solidified to prepare a toner particle of the present invention. Alternatively, the above-mentioned materials are melted and kneaded upon application of heat to prepare a kneaded mixture, and the kneaded mixture is dissolved or dispersed in a solvent to prepare a toner constituent liquid. Then, the toner constituent liquid is also finely dripped, dried and solidified to prepare a toner particle 25 of the present invention.

The toner materials includes at least a resin and a colorant, and optionally other components such as a carrier and a wax. The resin includes at least a binder resin. Specific examples of the binder resin include, but are not limited to, conventionally-used resins such as a vinyl polymers including styrene monomers, acrylic monomers or methacrylic monomers, or copolymers including two or more of the monomers; polyester polymers; polyol resins; phenol resins; silicone resins; polyurethane resins; polyamide resins; furan resins; epoxy resins; xylene resins; terpene resins; coumarone-indene resins; polycarbonate resins; petroleum resins; etc.

Specific examples of the styrene monomers include styrenes or their derivatives such as styrene, o-methylstyrene, m-methylstyrene, p-methylstyrene, p-phenylstyrene, p-ethylstyrene, 2,4-dimethylstyrene, p-n-butylstyrene, p-tert-butylstyrene, p-n-hexylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dochlorostyrne, m-nitrostyrene, o-nitrostyrene and p-nitrostyrene.

Specific examples of the acrylic monomers include an acrylic acid or their esters such as methylacrylate, ethylacrylate, n-butylacrylate, isobutylacrylate, n-octylacrylate, n-dodecylacrylate, 2-ethylhexylacrylate, stearylacrylate, 2-chloroethylacrylate and phenylacrylate.

Specific examples of the methacrylic monomers include a methacrylic acid or their esters such as a methacrylic acid, methylmethacrylate, ethylmethacrylate, propylmethacrylate, n-butylmethacrylate, isobutylmethacrylate, n-octylmethacrylate, n-dodecylmethacrylate, 2-ethylhexylmethacrylate, stearylmethacrylate, phenylmethacrylate, dimethylaminoethylmethacrylate and diethylaminoethylmethacrylate.

Specific examples of other monomers forming the vinyl polymers or copolymers include the following materials (1) to (18):

(1) monoolefins such as ethylene, propylene, butylene and isobutylene; (2) polyenes such as butadiene and isoprene; (3) halogenated vinyls such as vinylchloride, vinylidenechloride, vinylbromide and vinylfluoride; (4) vinyl esters such as vinylacetate, vinylpropionate and vinylbenzoate; (5) vinylethers such as vinylmethylether, vinylethylether and vinylisobutylether; (6) vinylketones such as vinylmethylketone, vinylhexylketone and methyl isopropenylketone; (7) N-vinyl compounds such as N-vinylpyrrole, N-vinylcarbazole, N-vinylindole and N-vinylpyrrolidone; (8) vinylnaphthalenes; (9) acrylic acid or methacrylic acid derivatives such as acrylonitrile, methacrylonitrile and acrylamide; (10) unsaturated diacids such as a maleic acid, a citraconic acid, an itaconic acid, an alkenylsuccinic acid, a fumaric acid and a mesaconic acid; (11) unsaturated diacid anhydrides such as a maleic acid anhydride, a citraconic acid anhydride, an itaconic acid anhydride and an alkenylsuccinic acid anhydride; (12) monoesters of unsaturated diacids such as monomethylester maleate, monoethylester maleate, monobutylester maleate, monomethylester citraconate, monoethylester citraconate, monobutylester citraconate, monomethylester itaconate, monomethylester alkenylsuccinate, monomethylester fumarate and monomethylester mesaconate; (13) esters of unsaturated diacids such as a dimethyl maleic acid and a dimethyl fumaric acid; (14) α,β-unsaturated acids such as a crotonic acid and a cinnamic acid; (15) α,β-unsaturated acid anhydrides such as crotonic acid anhydride and a cinnamic acid anhydride; (16) monomers having a carboxyl group, such as anhydrides of the α,β-unsaturated acids and lower fatty acids, an alkenylmalonic acid, alkenyl glutaric acid alkenyl adipic acid, their anhydrides and monoesters; (17) hydroxyalkylester acrylates or methacrylates such as 2-hydroxyethylacrylate, 2-hydroxyethylmethacrylate and 2-hydroxypropylmethacrylate; and (18) monomers having a hydroxy group such as 4-(1-hydroxy-1-methylbutyl)styrene and 4-(1-hydroxy-1-methylhexyl)styrene.

The vinyl polymer or copolymer of the binder resin may have a crosslinked structure formed by a crosslinker having 2 or more vinyl groups. Specific examples of the crosslinker include aromatic divinyl compounds such as divinylbenzene and divinylnaphthalene; diacrylate compounds bonded with an alkyl chain, such as ethyleneglycoldiacrylate, 1,3-butyleneglycoldiacrylate, 1,4-butanedioldiacrylate, 1,5-pentanedioldiacrylate, 1,6-hexanedildiacrylate, neopentylglycoldiacrylate or their dimethacrylates; and diacrylate compounds bonded with an alkyl chain including an ester bond, such as diethyleneglycoldiacrylate, triethyleneglycoldiacrylate, tetraethyleneglycoldiacrylate, polyethyleneglycoldiacrylate#400, polyethyleneglycoldiacrylate#600, dipropyleneglycoldiacrylate or their dimethacrylates.

Diacrylate or dimethacrylate compounds bonded with a chain including an aromatic group and an ether bond can also be used. Polyester diacrylates include a product named MANDA from NIPPON KAYAKU CO., LTD.

Specific examples of a multifunctional crosslinker include pentaerythritoltriacrylate, trimethylolethanetriacrylate, trimethylolpropanetriacrylate, tetramethylolmethanetetraacrylate, oligoesteracrylate and their methacrylates, triallylcyanurate and triallyltrimellitate.

The toner preferably includes the crosslinker in an amount of 0.001 to 10 parts by weight, more preferably from 0.03 to 5 parts by weight based on total weight of the monomer. Among these crosslinking monomers, the aromatic divinyl compounds, particularly the divinylbenzene and the diacrylate compounds bonded with a bonding chain including an aromatic group and an ether bond are preferably used in terms of the fixability and offset resistance of the resultant toner. Further, styrene copolymers and styrene-acrylic copolymers are more preferably used.

Specific examples of a polymerization initiator used for preparing the vinyl polymer or copolymer include azo polymerization initiators such as 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobisisobutylate, 1,1'-azobis(cyclohexanecarbonitrile), 2-(carbamoylazo)-isobutyronitrile, 2,2'-azobis(2,4,4-trimethylpentane), 2-phenylazo-2',4'-fimethyl-4'-methoxyvaleronitrile and 2,2'-azobis(2-methylpropane); ketone peroxides such as methyl ethyl ketone peroxide, acetylacetone peroxide and cyclohexanone peroxide; 2,2-bis(tert-butylperoxy)butane; tert-butylhydroperoxide; cumenehydroperoxide; 1,1,3,3-tetramethylbutylhydroperoxide; di-tert-butylperoxide; tert-butylcumylperoxide; di-cumylperoxide; α-(tert-butylperoxy)isopropylbenzene; isobutylperoxide; octanoylperoxide; decanoylperoxide; lauroylperoxide; 3,5,5-trimethylhexanoylperoxide; benzoylperoxide; m-tolylperoxide; di-isopropylperoxydicarbonate; di-2-ethylhexylperoxydicarbonate; di-n-propylperoxydicarbonate; di-2-ethoxyethylperoxycarbonate; di-ethoxyisopropylperoxydicarbonate; di(3-methyl-3-methoxybutyl)peroxycarbonate; acetylcyclohexylsulfonylperoxide; tert-butylperoxyacetate; tert-butylperoxyisobutylate; tert-butylperoxy-2-ethylhexylate; tert-butylperoxylaurate; tert-butyl-oxybenzoate; tert-butylperoxyisopropylcarbonate; di-tert-butylperoxyisophthalate; tert-butylperoxyallylcarbonate; isoamylperoxy-2-ethylhexanoate; di-tert-butylperoxy-hexahydroterephthalate; tert-butylperoxyazelate; etc.

When the binder resin is selected from styrene-acrylic resins, the binder resin preferably includes elements soluble with tetrahydrofuran (THF), having at least one peak in a range of 3,000 to 50,000 (number-average molecular weight) and at one peak in a range not less than 100,000 in a molecular weight distribution by GPC thereof in terms of the fixability, offset resistance and storage stability of the resultant toner. In addition, the THF-soluble elements having a molecular weight not greater than 100,000 is preferably from 50 to 90% by weight based on total weight of the THF-soluble elements. Further, the THF-soluble elements preferably have a main peak in a molecular weight range of from 5,000 to 30,000, and more preferably from 5,000 to 20,000. When the binder resin is selected from vinyl polymers such as styrene-acrylic resins, the binder resin preferably has an acid value of from 0.1 to 100 mg KOH/g, more preferably from 0.1 to 70 mg KOH/g, and much more preferably from 0.1 to 50 mg KOH/g.

Specific examples of monomers forming polyester polymers include the following materials.

Specific examples of bivalent alcohol include diols such as ethyleneglycol, propyleneglycol, 1,3-butanediol, 1,4-butanediol, 2,3-butanediol, 1,4-butenediol, diethyleneglycol, triethyleneglycol, 1,5-pentanediol, 1,6-hexanediol, neopentylglycol, 2-ethyl-1,3-hexanediol, and diols formed by polymerizing hydrogenated bisphenol A or bisphenol A with cyclic ethers such as an ethylene oxide and a propylene oxide. In order to crosslink polyester resins, alcohol having 3 valences or more is preferably used together.

Specific examples of polyalcohol having 3 or more valences include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxybenzene, etc.

Specific examples of acids forming the polyester polymers include benzene dicarboxylic acids or their anhydrides such as a phthalic acid, an isophthalic acid and a terephthalic acid; alkyl dicarboxylic acids or their anhydrides such as a succinic acid, an adipic acid, a sebacic acid and an azelaic acid; unsaturated diacids such as a maleic acid, a citraconic acid, an itaconic acid, an alkenylsuccinic acid, a fumaric acid and a mesaconic acid; and unsaturated diacid anhydrides such as a maleic acid anhydride, a citraconic acid anhydride, an itaconic acid anhydride and an alkenylsuccinic acid anhydride; etc. Specific examples of polycarboxylic acids having 3 or more valences include a trimellitic acid, a pyromellitic acid, a 1,2,4-benzenetricarboxylic acid, a 1,2,5-benzenetricarboxylic acid, a 2,5,7-naphthalenetricarboxylic acid, a 1,2,4-naphthalenetricarboxylic acid, a 1,2,4-butanetricarboxylic acid, a 1,2,5-hexanetricarboxylic acid, a 1,3-dicarboxyl-2-methyl-methylenecarboxypropane, tetra(methylenecarboxyl)methane, 1,2,7,8-octantetracarboxylic acids, empol trimer or their anhydrides, or those partially replaced with lower alkyl esters, etc.

When the binder resin is a polyester resin, the binder resin preferably includes elements soluble with tetrahydrofuran (THF), having at least one peak in a range of 3,000 to 50,000 (number-average molecular weight) in a molecular weight distribution by GPC thereof in terms of the fixability and offset resistance of the resultant toner. In addition, the THF-soluble elements having a molecular weight not greater than 100,000 is preferably from 60 to 100% by weight based on total weight of the THF-soluble elements. Further, the THF-soluble elements preferably have a main peak in a molecular weight range of from 5,000 to 20,000. When the binder resin is a polyester resin, the binder resin preferably has an acid value of from 0.1 to 100 mgKOH/g, more preferably from 0.1 to 70 mgKOH/g, and most preferably from 0.1 to 50 mgKOH/g. The molecular weight distribution of the binder resin is measured by gel permeation chromatography (GPC) using THF as a solvent.

In the vinyl polymers and/or polyester resins, resins including monomers reactable therewith can be used. Specific examples of the monomers forming the polyester resin, reactable with the vinyl polymer include unsaturated dicarboxylic acids or their anhydrides such as a phthalic acid, a maleic acid, a citraconic acid and an itaconic acid. Specific examples of the monomers forming the vinyl polymer include monomers having a carboxyl group or a hydroxy group, and an acrylic acid or ester methacrylates. When the polyester polymer, vinyl polymer and other binder resins are used together, the united resins preferably includes resins having an acid value of from 0.1 to 50 mgKOH/g in an amount of 60% by weight.

The acid value of the binder resin can be measured according to JIS K-0070 as follows.

(1) Additives besides the binder resin (polymer) are removed from a sample or an acid value and a content of the additives besides the binder resin are measured before measured. 0.5 to 2.0 g of the sample is precisely weighed and the weight of the polymer is W g. For example, when the acid value of a binder resin in a toner is measured, the acid value and content of a colorant or a magnetic material are measured beforehand, and the acid value of the binder resin is calculated.

(2) The samples is dissolved with 150 ml of a mixture of toluene/ethanol (volume ratio 4/1) to prepare a solution in a beaker having a capacity of 300 ml.

(3) The solution is titrated with a potentiometric titrator using an ethanol solution 0.1 mol/l KOH.

(4) The usage of the ethanol solution is S (ml), and at the same time, the usage thereof without the sample is B (ml) and the acid value is determined by the following formula:

acid value (mg KOH/g)=[$(S-B) \times f \times 5.61$]/$W$ wherein f is a factor of KOH.

The binder resin and constituents including the binder resin of the toner preferably has a glass transition temperature of from 35 to 80° C., and more preferably from 40 to 75° C. in terms of the storage stability of the resultant toner. When lower than 35° C., the resultant toner tends to deteriorate in an environment of high temperature, and have offset problems when fixed. When higher than 80° C., the fixability thereof tends to deteriorate.

Specific examples of magnetic materials for use in the present invention include (1) magnetic iron oxides such as magnetite, maghematite and ferrite and iron oxides including other metal oxides; (2) metals such as iron, cobalt and nickel or their metal alloys with metals such as aluminum, cobalt, copper, lead, magnesium, tin, zinc, antimony, beryllium, bismuth, cadmium, calcium, manganese, selenium, titanium, tungsten and vanadium; and (3) their mixtures. Specific examples thereof include $Fe_3O_4$, $\gamma$-$Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, an iron powder, a cobalt powder, a nickel powder, etc. These can be used alone or in combination. Particularly, fine powders of $Fe_3O_4$ and $\gamma$-$Fe_2O_3$ are preferably used.

In addition, magnetic iron oxides such as magnetite, maghematite and ferrite including a heterogeneous element or their mixtures can also be used. Specific examples of the heterogeneous element include lithium, beryllium, boron, magnesium, aluminum, silicon, phosphorus, germanium, zirconium, tin, sulfur, calcium, scandium, titanium vanadium, chrome, manganese, cobalt, nickel, copper, zinc, gallium, etc. Particularly, magnesium, aluminum, silicon, phosphorus or zirconium is preferably used. The heterogeneous element may be taken in a crystal lattice of the iron oxide or therein as an oxide. Alternatively, the heterogeneous element may be present on the surface thereof as an oxide or a hydroxide. The heterogeneous element is preferably included therein as an oxide.

The heterogeneous element can be taken in a magnetic material by mixing a salt thereof when preparing the magnetic material and performing a pH control. In addition, the heterogeneous element can be separated out on the surface of a magnetic material by performing the pH control or adding the salt thereof and performing the pH control after preparing the magnetic material. The toner preferably includes the magnetic material in an amount of from 10 to 200 parts by weight, and more preferably from 20 to 150 parts by weight per 100 parts by weight of the binder resin. The magnetic material preferably has a number-average particle diameter of from 0.1 to 2 μm, and more preferably from 0.1 to 0.5 μm. The number-average particle diameter can be determined by measuring a photograph thereof, zoomed by a transmission electron microscope, with a digitizer, etc. The magnetic material preferably has a coercivity of from 2 to 150 Oe, a saturated magnetization of from 50 to 200 emu/g and a residual magnetization of from 2 to 20 emu/g when applied with 10 k Oe. The magnetic material can be used as a colorant.

Specific examples of the colorants for use in the present invention include any known dyes and pigments such as carbon black, Nigrosine dyes, black iron oxide, NAPHTHOL YELLOWS, HANSA YELLOW (10G, 5G and G), Cadmium Yellow, yellow iron oxide, loess, chrome yellow, Titan Yellow, polyazo yellow, Oil Yellow, HANSA YELLOW (GR, A, RN and R), Pigment Yellow L, BENZIDINE YELLOW (G and GR), PERMANENT YELLOW (NCG), VULCAN FAST YELLOW (5G and R), Tartrazine Lake, Quinoline Yellow Lake, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, PERMANENT RED (F2R, F4R, FRL, FRLL and F4RH), Fast Scarlet VD, VULCAN FAST RUBINE B, Brilliant Scarlet G, LITHOL RUBINE GX, Permanent Red F5R, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone and their mixtures.

The toner preferably includes the colorant in an amount of from 1 to 15% by weight, and more preferably from 3 to 10% by weight.

The colorant for use in the present invention can be used as a masterbatch when combined with a resin. Specific examples of the resin used in the masterbatch or used with the masterbatch include the modified and unmodified polyester resins mentioned above; styrene polymers and substituted styrene polymers such as polystyrene, poly-p-chlorostyrene and polyvinyltoluene; styrene copolymers such as styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers and styrene-maleic acid ester copolymers; and other resins such as polymethyl methacrylate, polybutylmethacrylate, polyvinyl chloride, polyvinyl acetate, polyethylene, polypropylene, polyesters, epoxy resins, epoxy polyol resins, polyurethane resins, polyamide resins, polyvinyl butyral resins, acrylic resins, rosin, modified rosins, terpene resins, aliphatic or alicyclic hydrocarbon resins, aromatic petroleum resins, chlorinated paraffin, paraffin waxes, etc. These resins are used alone or in combination.

The masterbatch can be prepared by mixing and kneading a resin and a colorant upon application of high shearing stress thereto. In this case, an organic solvent is preferably used to increase interactions between the colorant and the resin. In addition, flushing methods, wherein an aqueous paste including a colorant is mixed with a resin solution of an organic solvent to transfer the colorant to the resin solution and then the aqueous liquid and organic solvent are separated and removed, is preferably used because the resultant wet cake of the colorant can be used as it is. A three roll mill is preferably used for kneading the mixture upon application of high shearing stress. The toner preferably includes the colorant in an amount of from 0.1 to 20 parts by weight per 100 parts by weight of the binder resin.

The masterbatch preferably includes a resin having an acid value not greater than 30 mg KOH/g and an amine value of from 1 to 100 and a colorant dispersed therein, and more preferably includes a resin having an acid value not greater than 20 mg KOH/g and an amine value of from 10 to 50 and a colorant dispersed therein. When the acid value is greater than 30 mg KOH/g, the chargeability of the resultant toner occasionally deteriorates due to high humidity and the colorant is insufficiently dispersed in the masterbatch occasionally. When the amine value is less than 1 and greater than 100, the colorant is insufficiently dispersed in the masterbatch occasionally. The acid value is measured by the method disclosed in JIS K0700 and the amine value in JIS K7237.

A dispersant preferably has high compatibility with a binder resin in terms of pigment dispersibility. Specific examples of marketed products thereof include AJISPER PB821 and AJISPER PB822 from Ajinomoto Fine-Techno Co., Inc.; Disperbyk-2001 from BYK-Chemie GmbH; and EFKA-4010 from EFKA ADDITIVES. A toner preferably includes the dispersant in an amount of from 0.1 to 10% by weight based on total weight of the colorant. When less than 0.1% by weight, the pigment is insufficiently dispersed occasionally. When greater than 10% by weight, the chargeability of the resultant toner occasionally deteriorates due to high humidity.

The dispersant preferably has a weight-average molecular weight, i.e., a molecular weight at a maximum main peak in the gel permeation chromatography of a styrene-converted weight, of from 500 to 100,000, more preferably from 3,000 to 100,000, furthermore preferably from 5,000 to 50,000, and most preferably form 5,000 to 30,000 in terms of pigment dispersibility. When less than 500, the dispersant has high polarity, resulting in occasional dispersibility deterioration of the colorant. When greater than 100,000, the dispersant has high affinity with a solvent, resulting in occasional dispersibility deterioration of the colorant.

The toner of the present invention may be mixed with a carrier and used as a two-component developer. Conventional carriers such as ferrite and magnetite, and resin-coated carriers can be used. The resin-coated carrier is formed of a carrier core material and a coating material, i.e., a resin coating the surface of the carrier core material. Specific examples of the resin include styrene-acrylic resins such as a styrene-ester-acrylate copolymer and a styrene-estermethacrylate copolymer; acrylic resins such as an esteracrylate copolymer and an estermethacrylate copolymer; fluorine-containing resins such as polytetrafluoroethylene, monochlorotrifluoroethylene polymer and polyvinylidene-fluoride; a silicone resin; a polyester resin; a polyamide resin; polyvinylbutyral; and an aminoacrylate resin. Besides, any resins such as an ionomer resin and a polyphenylenesulfide resin usable as a coating material for a carrier can be used. These can be used alone or in combination. In addition, a binder carrier core, wherein a magnetic powder is dispersed in a resin, can also be used.

Methods of coating a resin coating material on the surface of the carrier core include dissolving or suspending a resin in a solvent to prepare a coating solution and coating the coating solution thereon; and simply mixing a resin and the carrier core in the state of powders. The resin-coated carrier preferably includes a resin coating material in an amount of from 0.01 to 5% by weight, and more preferably from 0.1 to 1% by weight. Specific examples of use, wherein a magnetic material is coated with a coating mixture including two or more materials, include carriers formed of (1) 12 parts of a mixture of dimethylchlorosilane and dimethylsilicone oil (5/1) and 100 parts of a fine powder of titanium oxide; and (2) 20 parts of a mixture of dimethylchlorosilane and dimethylsilicone oil (5/1) and 100 parts of a fine powder of silica.

As the resin coating material, a styrene-methylmethacrylate copolymer, mixtures of fluorine-containing resins and styrene copolymers or a silicone resin is preferably used. Particularly, the silicone resin is more preferably used. Specific examples of the mixtures of fluorine-containing resins and styrene copolymers include a mixture of polyvinylidene fluoride and a styrene-methylmethacrylate copolymer; and a mixture of a polytetrafluoroethylene and a styrene-methylmethacrylate copolymer; a mixture of vinylidene fluoride-tetrafluoroethylene copolymer (10/90 to 90/10), a styrene-acrylate2-ethylhexyl copolymer (10/90 to 90/10) and a styrene-acrylate2-ethylhexyl-methylmethacrylate copolymer (20 to 60/5 to 30/10/50). Specific examples of the silicone resin include a nitrogen-containing silicone resin and a modified silicone resin formed from a reaction between a nitrogen-containing silane coupling agent and a silicone resin.

Magnetic materials for the carrier core include iron oxides such as ferrite, iron-excess ferrite, magnetite and γ-iron oxide; an metals such as iron, cobalt, nickel and their metal alloys. Specific examples of elements included therein include iron, cobalt, nickel, aluminum, copper, lead, magnesium, tin, zinc, antimony, beryllium, bismuth, calcium, manganese, selenium, titanium, tungsten, vanadium, etc. Copper-zinc-iron ferrite mainly including copper, zinc and iron; and manganese-magnesium-iron ferrite mainly including manganese, magnesium and iron are preferably used.

The carrier preferably has a resistivity of from $10^6$ to $10^{10}$ Ω·cm by controlling the concavities and convexities on the surface thereof an amount of a resin coated thereon. The carrier preferably has a particle diameter of from 4 to 200 μm, more preferably from 10 to 150 μm, and much more preferably from 20 to 100 μm. Particularly, the resin-coated carrier preferably has a 50% particle diameter of from 20 to 70 μm. The two-component developer preferably includes the toner of the present invention in an amount of from 1 to 200 parts by weight, and more preferably from 2 to 50 parts by weight per 100 parts by weight of the carrier.

The toner of the present invention may include a wax besides a binder resin and a colorant. Any known waxes can be used, and specific examples thereof include aliphatic hydrocarbon waxes such as low-molecular-weight polyethylene, low-molecular-weight polypropylene, a polyolefin wax, a microcrystalline wax, a paraffin wax and a sasol wax; aliphatic hydrocarbon wax oxides such as polyethylene oxide wax or their block copolymers; plant waxes such as a candelilla wax, a carnauba wax, a Japan wax, and a jojoba wax; animal waxes such as a bees wax, a lanolin and a whale wax; mineral waxes such as an ozokerite, a ceresin and a petrolatum; waxes mainly including fatty ester such as a montanic acid ester wax and a mosquito star wax; and waxes having partially or wholly deacidified fatty ester.

Specific examples of the wax further include saturated straight-chain fatty acids such as a palmitic acid, a stearic acid, a montanic acid and a straight-chain alkyl carboxylic acid having a straight-chain alkyl group; unsaturated fatty acids such as an eleostearic acid; saturated alcohols such as stearyl alcohol, behenyl alcohol, ceryl alcohol, mesilyl alcohol and long-chain alkyl alcohol; polyalcohols such as sorbitol; fatty acid amides such as linoleic amide, olefinic amide and lauric amide; saturated fatty acid bisamides such as methylenebisamide caprate, lauric ethylenebisamide and stearic hexamethylenebisamide; unsaturated fatty acid amides such as oleic ethylenebisamide, oleic hexamethylenebisamide, adipic N,N'-dioleylamide and sebacic N,N'-dioleylamide; aromatic bisamides such as stearic m-xylenebisamide and isophthalic N,N-distearylamide; fatty acid metal salts such as calcium stearate, calcium laurate, zinc stearate and magnesium stearate; an aliphatic hydrocarbon wax grafted with a vinyl monomer such as styrene and an acrylic acid; a partially esterified compound of fatty acids such as monoglyceride behenate and polyalcohol; and a methyl ester compound having a hydroxyl group, formed by adding a hydrogen atom to a vegetable oil.

Preferred waxes include polyolefin formed by radically polymerizing olefin under high pressure; polyolefin formed by refining a low-molecular-weight byproduct when polymerizing high-molecular-weight polyolefin; polyolefin formed by polymerizing olefin with a catalyst such as a Ziegler catalyst and a metallocene catalyst under low pressure; polyolefin formed by polymerizing olefin using a radiation, an electromagnetic ray or light; low-molecular-weight polyolefin formed by pyrolyzing high-molecular-weight polyolefin; a paraffin wax; a microcrystalline wax; a Fischer-Tropsh wax; synthetic hydrocarbon waxes synthesized by a synthol method, a hydronalium call method, etc.; synthetic waxes having a monomer having a carbon atom; hydrocarbon waxes having a functional group such as a hydroxyl group or a carboxyl group; mixtures of hydrocarbon waxes and hydrocarbon waxes having a functional group; and waxes graft-modified with a vinyl monomer such as styrene, ester maleate, acrylate, methacrylate and maleic acid anhydride.

In addition, these waxes having sharper molecular weight distributions after subjected to a press sweating process, a solvent process, a recrystallization process, a vacuum distillation process, a supercritical gas extraction process or a solution crystallization process are preferably used. Further, waxes, wherein low-molecular-weight fatty acids, low-molecular-weight solid alcohols, low-molecular-weight solid compounds and other impurities are removed from these waxes, are preferably used as well.

The wax preferably has a melting point of from 70 to 140° C., and more preferably from 70 to 120° C. to balance the fixability and offset resistance of the resultant toner. When lower than 70° C., blocking resistance thereof tends to deteriorate. When higher than 140° C., the offset resistance thereof is difficult to develop. In addition, combinations of two or more waxes can develop plasticizability and releasability of a wax at the same time.

A wax having plasticizability has a low melting point, or a branched-chain or a polar group on its molecular structure.

A wax having releasability has a low melting point, or a straight-chain or nonpolar group without a functional group on its molecular structure. Specific examples of the combinations include a combination of two ore more waxes having differences of melting point of from 10 to 100° C.; and a combination of polyolefin and graft-modified polyolefin.

When two waxes having similar structures are used, combinations of a low-melting-point wax relatively having plasticizability and a high-melting-point wax relatively having releasability are preferably used. The melting points preferably have a difference from 10 to 100° C. to effectively develop their separate functions. At least one of the waxes preferably has a melting point of from 70 to 120° C., and more preferably from 70 to 100° C. to exert the functional separation effect.

Waxes having branched-chain structures, polar groups such as functional groups, or waxes modified with components different from their main components relatively exert their plasticizabilities. On the other hand, waxes having straight-chain structure, nonpolar groups without functional groups, or unmodified waxes relatively exert their releasabilities. Preferred combinations of the waxes include a combination of a polyethylene homopolymer or copolymer primarily consisting of ethylene and a polyolefin homopolymer or copolymer primarily consisting of olefin besides ethylene; a combination of polyolefin and graft-modified polyolefin; a combination of an alcohol wax, a fatty acid wax or an ester wax and a hydrocarbon wax; a combination of a Fischer-Tropsh wax or a polyolefin wax and a paraffin wax or a microcrystalline wax; a combination of a Fischer-Tropsh wax and a polyolefin wax; a combination of a paraffin wax and a microcrystalline wax; a carnauba wax, a candelilla wax, a rice wax or a montan wax and a hydrocarbon wax.

The wax preferably has an endothermic peak in a range of from 70 to 110° C., and further a maximum peak therein when measured by a DSC method to balance the storage stability and fixability of the resultant toner. The toner of the present invention preferably includes the waxes in an amount of from 0.2 to 20 parts by weight, and more preferably from 0.5 to 10 parts by weight per 100 parts by weight of a binder resin.

The melting point of the wax is the maximum endothermic peak when measured by a DSC method. The endothermic peak of the wax or toner is preferably measure by a high-precision inner-heat input-compensation differential scanning calorimeter. The measurement method is based on ASTM D3418-82. A DSC curve measured when the temperature is increased at 10° C./min after increasing and decreasing the temperature is used.

The toner of the present invention may include a fluidity improver. The fluidity improver is added to the surface thereof to improve the fluidity thereof. Specific examples thereof include fluorine-containing resin powders such as carbon black, a vinylidene fluoride fine powder and a polytetrafluoroethylene fine powder; a silica fine powder such as a wet method silica and a dry method silica; a titanium oxide fine powder; an alumina fine powder; and a surface-treated silica, a surface-treated titanium oxide and a surface-treated alumina with a silane coupling agent, a titanium coupling agent or a silicone oil. Particularly, the silica fine powder, titanium oxide fine powder and alumina fine powder are preferably used. The surface-treated silica with a silane coupling agent or a silicone oil is more preferably used. The fluidity improver preferably has an average primary particle diameter of from 0.001 to 2 µm, and more preferably from 0.002 to 0.2 µm.

Preferred silica fine powders include a fine powder prepared by vapor-phase oxidizing a silicon halogen compound, i.e. a dry method silica or a fumed silica. Specific examples of the marketed silica fine powders include AEROSIL-130, -300, -380, -TT600, -MOX170, -MOX80 and -COK84 from NIPPON AEROSIL CO., LTD.; Ca-O-SiL-M-5, -MS-7, -MS-75, -HS-5 and -EH-5 from Cabot Corp.; Wacker HDK-N20, -V15, -N20E, -T30 and -T40 from WACKER-CHEMIEGMBH; D-CFineSilica from Dow Corning Corp.; and Fansol from Fransil.

The silica fine powder prepared by vapor-phase oxidizing a silicon halogen compound is preferably hydrophobized. The hydrophobized silica fine powder preferably has a hydrophobicity of from 30 to 80% when measured by a methanol titration method. The silica fine powder is chemically or physically hydrophobized with an organic silicon compound.

Specific examples thereof include hydroxypropyltrimethoxysilane, phenyltrimethoxysilane, n-hexadecyltrimethoxysilane, n-octadecyltrimethoxysilane, vinylmethoxysilane, vinyltriethoxysilane, vinyltriacetoxysilane, dimethylvinylchlorosilane, divinylchlorosilane, γ-methacryloxypropyltrimethoxysilane, hexamethyldisilane, trimethylsilane, trimethylchlorosilane, dimethyldichlorosilane, methyltrichlorosilane, allyldimethylchlorosilane, allylphenyldichlorosilane, benzyldimethylchlorosilane, bromomethyldimethylchlorosilane, α-chlorethyltrichlorosilane, β-chloroethyltrichlorosilane, chloromethyldimethylchlorosilane, triorganosilylmercaptan, trimethylsilylmercaptan, triorganosilylacrylate, vinyldimethylacetoxysilane, dimethyletoxysilane, trimethyletoxysilane, trimethylmetoxysilane, methyltrietoxysilane, isobutyltrimetoxysilane, dimethyldimethoxysilane, diphenyldiethoxysilane, hexamethyldisiloxane, 1,3-divinyltetramethyldisiloxane, 1,3-diphenyltetramethyldisiloxane, dimethylpolysiloxane having 2 to 12 siloxane units and 0 to 1 hydroxyl group bonded with Si at the end unit, etc. Further, silicone oils such as a dimethyl silicone oil can also be used. This can be used alone or in combination. The fluidity improver preferably has a number-average particle diameter of from 5 to 100 nm, and more preferably from 5 to 50 nm.

The fluidity improver preferably has a specific surface area not less than 30 $m^2/g$, and more preferably from 60 to 400 $m^2/g$ when measured by a BET nitrogen absorption method. When a surface-treated fine powder, the fluidity improver preferably has a specific surface area not less than 20 $m^2/g$, and more preferably from 40 to 300 $m^2/g$. The fluidity improver is preferably included in a toner in an amount of from 0.03 to 8 parts by weight per 100 parts by weight of the toner.

As other additives, various metal soaps, fluorine-containing surfactants and dioctylphthalate may optionally be included in the toner of the present invention for the purpose of protecting a photoreceptor or a carrier; improving the cleanability thereof; controlling heat, electrical and physical properties thereof; controlling the resistivity thereof; controlling the softening point thereof; and improving the fixability thereof; etc. As an electroconductivity imparting agent, inorganic fine powders such as tin oxide, zinc oxide, carbon black, antimony oxide, titanium oxide, aluminum oxide and alumina may optionally be included therein. The inorganic fine powders may optionally be hydrophobized. Lubricants such as polytetrafluoroethylene, zinc stearate and polyvinylidenefluoride; abrasives such as cesium oxide, silicon carbonate and strontium titanate; caking inhibitors; and developability improvers such as white and black particulate materials having polarities reverse to that of a toner can also be used in a small amount. The additives preferably treated with various agents such as silicone varnishes, various modified silicone varnishes, silicone oils, various modified silicone oils, silane coupling agents, silane coupling agents having functional groups and other organic silicon compounds for the purpose of controlling the charge amount of the resultant toner.

A developer can be prepared by the following method. The inorganic particulate materials such as a hydrophobic silica fine powder may be added to a developer to increase the storage stability, developability and transferability thereof. A typical powder mixer is used to mix external additives, and preferably includes a jacket and is capable of controlling inner temperature. The external additive may gradually be added in the mixer or on the way of mixing to change the history of stressing the external additive. As a matter of course, the number of rotations, rotation speed, mixing time and mixing temperature of the mixer may be changed. A large stress may be applied to the external additive at the beginning, and comparatively a small stress is applied thereto then, or vice versa. Specific examples of the mixers include V-type Mixer, Rocking Mixer, Loedge Mixer, Nauter Mixer and Henschel Mixer.

In order to control the shape of a toner, after toner constituents such as a binder resin and a colorant are melted and kneaded upon application of heat, cooled and pulverized, the shape of the toner is mechanically controlled by Hybridizer or Machanofusion. Alternatively, the toner constituents are dissolved and dispersed in a solvent capable of dissolving the binder resin, and the solvent is removed from the dispersion by a spray drier to prepare a spherical toner. A spherical toner can also be prepared by being heated in an aqueous medium.

Inorganic particulate materials can externally be added to the toner of the present invention to supplement the chargeability thereof. Specific examples of the inorganic particulate material include silica, alumina, titanium oxide, barium titanate, magnesium titanate, calcium titanate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, silicon nitride, etc. The inorganic particulate material preferably has a primary particle diameter of from 2 to 5 µm, and more preferably from 5 to 500 µm. The inorganic particulate material preferably has a specific surface area of from 20 to 500 $m^2/g$ when measured by a BET nitrogen absorption method. The inorganic particulate material is preferably included in a toner in an amount of from 0.01 to 5% by weight, and more preferably from 0.01 to 2.0% by weight based on total weight of the toner.

Besides, polymer particulate materials, e.g., polystyrene, ester methacrylate and ester acrylate copolymers formed by soap-free emulsifying polymerization, suspension polymerization and dispersion polymerization; polycondensated particulate materials such as silicone, benzoguanamine and nylon; and polymerized particulate materials formed of thermosetting resins can also be used.

The external additives can be treated with a surface treatment agent to increase the hydrophobicity to prevent deterioration of fluidity and chargeability even in an environment of high humidity.

Specific examples of the surface treatment agent include a silane coupling agent, a sililating agents a silane coupling agent having an alkyl fluoride group, an organic titanate coupling agent, an aluminum coupling agent a silicone oil and a modified silicone oil.

The toner of the present invention may include a cleanability improver for removing a developer remaining on a photoreceptor and a first transfer medium after transferred. Specific examples of the cleanability improver include fatty acid metallic salts such as zinc stearate, calcium stearate and stearic acid; and polymer particulate materials prepared by a soap-free emulsifying polymerization method such as a polymethylmethacrylate particulate material and a polystyrene particulate material. The polymer particulate materials comparatively have a narrow particle diameter distribution and preferably have a volume-average particle diameter of from 0.01 to 1 μm.

Any known photoreceptors such as an organic photoreceptor, am amorphous silica photoreceptor, a selenium photoreceptor and a zinc oxide photoreceptor can be used in the present invention.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

First, a carbon black dispersion was prepared.

17 parts of carbon black (Regal 1400 from Cabot Corp.), 3 parts of a pigment dispersant (AJISPER PB821 from Ajinomoto Fine-Techno Co., Inc.) and 80 parts of ethylacetate were primarily dispersed by a mixer having an agitation blade to prepare a primary dispersion. The primary dispersion was more dispersed with higher shearing strength by a dyno-mill to prepare a secondary dispersion completely free from aggregates having a size not less than 5 μm.

Next, a wax dispersion was prepared.

18 parts of carnauba wax, 2 parts of a wax dispersant (a polyethylene wax grafted with a styrene-butylacrylate copolymer) and 80 parts of ethylacetate were primarily dispersed by a mixer having an agitation blade to prepare a primary dispersion to prepare a primary dispersion. After the primary dispersion was heated to have a temperature of 80° C. while agitated to dissolve the carnauba wax, the dispersion was cooled to have a room temperature and wax particles having a maximum diameter not greater than 3 μm were precipitated. The primary dispersion was more dispersed with higher shearing strength by a dyno-mill such that the wax particles have a maximum diameter not greater than 2 μm.

Next, a toner constituent dispersion including a binder resin, the colorant dispersion and the wax dispersion was prepared. 100 parts of a polyester resin, each 30 parts of the colorant dispersion and the wax dispersion, and 840 parts of ethylacetate were agitated for 10 min to be uniformly dispersed by a mixer having an agitation blade to prepare a dispersion. The pigment and wax did not aggregate with the solvent. The dispersion had a electroconductivity of $1.8 \times 10^{-7}$ S/m.

The dispersion was fed into the dripper 11. The thin film 16 was formed of a nickel plate having an outer diameter of 8.0 mm and a thickness of 20 μm, on which tapered nozzles 15 having a diameter of 50 μm at aperture contacting the liquid level 19 and a diameter of 10 μm at the liquid discharge aperture 18 were formed by electroforming. The nozzles were formed in the shape of a houndstooth check at the center of the plate in an area having a diameter of 5 mm such that there is a distance of 100 μm between each nozzle.

After a droplet was discharged under the following conditions, the droplet was dried and solidified to prepare toner particles.

Toner constituent liquid viscosity: 10.8 mPa·s
Dry airflow rate: dry nitrogen in apparatus 30.0 L/min
Temperature in apparatus: 27 to 28° C.
Dew point: −20° C.
Nozzle oscillation: 103 kHz The dried and solidified toner particles 25 were collected with a filter with pores having a diameter of 1 μm. The particle diameter distribution of the toner particles was measured by FPIA-2000 under the following conditions. The toner particles had a weight-average particle diameter (D4) of 5.0 μm, a number-average particle diameter (Dn) of 4.7 μm. The toner particles 25 were stably prepared for 3 hrs without reduction due to clogging of the nozzles. The following properties of the toner were evaluated. The results are shown in Table 1.

<Particle Diameter Distribution>

The particle diameter distribution of the toner can be measured by a flow type particle image analyzer FPIA-2100 from Toa Medical Electronics Co., Ltd.

A few drops a nonion surfactant (preferably Contaminon from Wako Pure Chemical Industries, Ltd.) are added to 10 ml of water which is filtered such that a microscopic dust is removed therefrom to include 20 or less of particles in a measurement range, e.g., having a circle-equivalent diameter of from 0.60 to less than 159.21 μm in a volume of $10^{-3}$ cm$^3$ to prepare a mixture. Further, 5 mg of a sample are added thereto and the mixture is dispersed by an ultrasonic disperser UH-50 from STM Corp. at 20 kHz, 50 W/10 cm$^3$ for 1 min to prepare a dispersion. The dispersion is further dispersed for totally 5 min to include the particles having a circle-equivalent diameter of from 0.60 to less than 159.21 μm in an amount of 4,000 to 8,000/$10^{-3}$ cm$^3$ and the particle diameter distribution thereof was measured.

The sample dispersion is passed through a flow path (expanding along the flowing direction) of a flat and transparent flow cell (having a thickness of 200 μm). A strobe light and a CCD camera are located facing each other across the flow cell to form a light path passing across the thickness of the flow cell. While the sample dispersion flows, strobe light is irradiated to the particles at an interval of ⅓₀ sec to obtain images thereof flowing on the flow cell, and therefore a two-dimensional image of each particle having a specific scope parallel to the flow cell is photographed. From the two-dimensional image, the diameter of a circle having the same area is determined as a circle-equivalent diameter.

The circle-equivalent diameters of 1,200 or more of the particles can be measured and a ratio (% by number) of the particles have a specified circle-equivalent diameter can be measured.

<Thin Line Reproducibility>

The toner was set in modified copier imagio Neo 271 from Ricoh Company, Ltd., and images having an image area of 7% were produced on 6000 paper from Ricoh Company, Ltd. Thin line images on each of the 100,000$^{th}$ and 30,000$^{th}$ were observed with an optical microscope at a magnification of 100 times and compared with a grade sample to classify them into 4 grades (⊚>○>Δ>X). X cannot be used as a product. An organic photoreceptor was used for a negatively-charged toner and an amorphous silicon photoreceptor for a positively-charged toner.

In Developing Method 1, the toner was directly transported to a developing site on an airflow and an electrostatic latent image was developed with a powder cloud of the toner. In Developing Method 2, a resin-coated carrier used in conventional electrophotography was used for transporting the toner. The carrier was formed by the following method:

dispersing a silicone resin in toluene to prepare a dispersion;

spraying the dispersion on core materials which are ferrite particles having an average particle diameter of 50 μm while heated to prepare coated ferrite particles; and burning and cooling the coated ferrite particles to prepare carrier particles having an average resin layer thickness of 0.2 μm.

<Preparation Stability>

The discharge quantity for 1 min of the toner constituent liquid was measured when 5, 30, 60, 120 and 180 min passed after the discharge thereof started to see the toner preparation variation.

⊚: not greater than 5%
○: not greater than 10%
Δ: not greater than 25%
X: greater than 25%

Example 2

The preparation and evaluation of the toner in Example 1 were repeated except that the nozzle 15 had the shape of a circular truncated cone from the aperture contacting the liquid level 19 to the liquid discharge aperture 18. The toner had a weight-average particle diameter (D4) of 5.0 μm and a number-average particle diameter (Dn) of 4.8 μm. The evaluation results are shown in Table 1. The toner particles 25 were stably prepared for 3 hrs without reduction due to clogging of the nozzles.

Example 3

The preparation and evaluation of the toner in Example 1 were repeated except that a pitch between the nozzles was 50 μm. The toner had a weight-average particle diameter (D4) of 5.5 μm and a number-average particle diameter (Dn) of 5.2 μm. The evaluation results are shown in Table 1. The toner particles 25 were stably prepared for 3 hrs without reduction due to clogging of the nozzles.

Comparative Example 1

The preparation of the toner constituent dispersion in Example 1 was repeated. The apparatus used in Example 1 was replaced with an apparatus equipped with a reservoir retaining the dispersion and a head capable of applying a piezoelectric pulse to the reservoir by expansion and contraction of a piezoelectric body to discharge a droplet of the dispersion from a nozzle of the head. The droplet was to be discharged under the following conditions.

Toner constituent liquid viscosity: 10.8 mPa·s
Dry airflow rate: dry nitrogen in apparatus 30.0 L/min
Temperature in apparatus: 27 to 28° C.
Dew point: −20° C.
Nozzle oscillation: 20 kHz The liquid had too high viscosity to discharge from the nozzle.

Comparative Example 2

The preparation of the toner constituent dispersion in Example 1 was repeated except for further diluting the dispersion with the solvent three times as much as the original solvent to have a viscosity of 2.8 mPa·s. The preparation of the toner in Comparative Example 1 was repeated. The dried and solidified toner particles were collected with a filter with pores having a diameter of 1 μm. The particle diameter distribution of the toner particles was measured by FPIA-2000 under the following conditions. The toner particles had a weight-average particle diameter (D4) of 6.2 μm, a number-average particle diameter (Dn) of 3.2 μm. About a half of the nozzles had difficulty in discharging after continuous operation for 3 hrs. The above-mentioned properties of the resultant toner were evaluated, and the results are shown in Table 1.

Comparative Example 3

The preparation and evaluation of the toner in Example 1 were repeated except that a pitch between the nozzles was 28 μm. The toner had a weight-average particle diameter (D4) of 12.4 μm and a number-average particle diameter (Dn) of 8.8 μm. The evaluation results are shown in Table 1. The pitch between the nozzles was so narrow that the discharged droplets were thought to be combined with each other before dried, resulting in a large average particle diameter of the resultant toner particles.

TABLE 1

|  | D4 (μm) | Dn (μm) | Thin Line reproducibility | Preparation stability |
|---|---|---|---|---|
| Example 1 | 5.0 | 4.7 | ⊚ | ⊚ |
| Example 2 | 5.0 | 4.8 | ⊚ | ⊚ |
| Example 3 | 5.0 | 5.2 | ○ | ⊚ |
| Comparative Example 1 | — | — | — | X |
| Comparative Example 2 | 6.2 | 3.2 | Δ | Δ |
| Comparative Example 3 | 12.4 | 8.8 | X | ○ |

As shown in Table 1, the present invention stably and efficiently prepares a toner having quite good properties. Images developed with the toner of the present invention are faithful to electrostatic latent images and have very good image quality. Further, having a uniform average particle diameter, the toner of the present invention has no or very little variation in many properties such as fluidity and chargeability required for a toner.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2007-130295, filed on May 16, 2007, the entire contents of which are herein incorporated by reference.

What is claimed is:

1. A method of preparing a toner, comprising:
   periodically dripping and discharging droplets of a toner constituent liquid comprising a resin and a colorant with a dripper, the dripper comprising
      a thin film being a metallic film having a thickness of from 5 to 500 μm and having a planar shape, and comprising plural nozzles configured to discharge the droplets in a liquid discharge direction, and
      an electromechanical converter configured to oscillate the thin film and including an oscillator disposed to oscillate the plural nozzles, wherein one oscillator causes a plurality of the nozzles discharge a liquid; and solidifying the droplets to form toner particles, wherein each particular nozzle of the plural nozzles has an aperture in a liquid contact surface of the thin film, the liquid contact surface being in contact with the toner constituent liquid, and an aperture in a liquid discharge surface of the thin film from which a droplet is discharged, the aperture in the liquid discharge surface of the thin film having a circular or an ellipsoidal cross-sectional shape and a cross-sectional area smaller than a cross-sectional area of the aperture contacting the toner constituent liquid, the nozzle is tapered from the aperture in the liquid contact surface of the thin film toward the aperture in the liquid discharge surface of the thin film, and the nozzle gradually narrows from the liquid contact surface to the liquid discharge surface such that a cross-section of the nozzle along the liquid discharge direction has curved sides, and wherein the plural nozzles through which the droplets are discharged are disposed on the thin film to form one or more offset arrays, and wherein a pitch between the nozzles, which are formed by nickel electroforming and are disposed on the thin film to form the offset arrays, has a length not less than 3 times as long as a diameter of the aperture discharging the droplet.

2. The method of claim 1, wherein the aperture in the liquid contact surface of the thin film has a minimum diameter not less than 10 times as large as an average particle diameter of solid dispersed particles included in the toner constituent liquid.

3. A toner preparation apparatus, comprising:

a dripper configured to periodically drip and discharge droplets of a toner constituent liquid comprising a resin and a colorant, the dripper comprising a thin film being a metallic film having a thickness of from 5 to 500 μm and having a planar shape and comprising plural nozzles configured to discharge the droplets in a liquid discharge direction, and an electromechanical converter configured to oscillate the thin film and including an oscillator disposed to oscillate the plural nozzles, wherein one oscillator causes a plurality of the nozzles discharge a liquid; and a particle former configured to solidify the droplets to form toner particles, wherein each particular nozzle of the plural nozzles has an aperture in a liquid contact surface of the thin film, the liquid contact surface being in contact with the toner constituent liquid, and an aperture in a liquid discharge surface of the thin film from which a droplet is discharged, the aperture in the liquid discharge surface of the thin film having a circular or an ellipsoidal cross-sectional shape and a cross-sectional area smaller than a cross-sectional area of the aperture contacting the toner constituent liquid, the nozzle is tapered from the aperture in the liquid contact surface of the thin film toward the aperture in the liquid discharge surface of the thin film, and the nozzle gradually narrows from the liquid contact surface to the liquid discharge surface such that a cross-section of the nozzle along the liquid discharge direction has curved sides, and wherein the plural nozzles are disposed on the thin film to form one or more offset arrays, and wherein a pitch between the nozzles, which are formed by nickel electroforming and are disposed on the thin film to form the offset arrays, has a length not less than 3 times as long as a diameter of the aperture discharging the droplet.

4. The toner preparation apparatus of claim 3, wherein the aperture in the liquid contact surface of the thin film has a minimum diameter not less than 10 times as large as an average particle diameter of solid dispersed particles included in the toner constituent liquid.

5. The toner preparation apparatus of claim 3, wherein a pitch between the nozzles has a length not less than 3 times as long as a diameter of the aperture discharging the droplet.

6. The toner preparation apparatus of claim 3, wherein the dripper oscillates the thin film with an oscillation mode having no joint diametrically.

7. The toner preparation apparatus of claim 3, wherein the dripper oscillates the thin film at a frequency not less than 20 kHz and less than 2.0 MHz.

8. The toner preparation apparatus of claim 3, wherein the plural nozzles are located in an area of the thin film, having a displacement of a sound pressure generated by the electromechanical converter of from 10 kPa to 500 kPa.

9. The toner preparation apparatus of claim 3, wherein the plural nozzles are located in an area of the thin film, having a ratio R ($\Delta L_{max}/\Delta L_{min}$) of a maximum ($\Delta L_{max}$) to a minimum ($\Delta L_{min}$) of an oscillation direction displacement not greater than 2.0.

10. The toner preparation apparatus of claim 3, further comprising a discharger configured to discharge the toner particles.

11. The toner preparation apparatus of claim 3, further comprising a toner collector configured to collect the toner particles with an airflow.

12. The toner preparation apparatus of claim 11, further comprising a toner reservoir configured to reserve the toner particles.

13. A toner preparation apparatus, comprising:

a dripper configured to periodically drip and discharge droplets of a toner constituent liquid comprising a resin and a colorant, the dripper comprising a thin film being a metallic film having a thickness of from 5 to 500 μm and having a planar shape and comprising plural nozzles configured to discharge the droplets in a liquid discharge direction, and an electromechanical converter including an oscillator disposed on a planar surface of the thin film to oscillate the plural nozzles, wherein one oscillator causes a plurality of the nozzles discharge a liquid; and a particle former configured to solidify the droplets to form toner particles, wherein each particular nozzle of the plural nozzles has an aperture in a liquid contact surface of the thin film, the liquid contact surface being in contact with the toner constituent liquid, and an aperture in a liquid discharge surface of the thin film from which a droplet is discharged, the aperture in the liquid discharge surface of the thin film having a circular or an ellipsoidal cross-sectional shape and a cross-sectional area smaller than a cross-sectional area of the aperture contacting the toner constituent liquid, the nozzle is tapered from the aperture in the liquid contact surface of the thin film toward the aperture in the liquid discharge surface of the thin film, and the nozzle gradually narrows from the liquid contact surface to the liquid discharge surface such that a cross-section of the nozzle along the liquid discharge direction has curved sides, and wherein a pitch between the nozzles, which are formed by nickel electroforming and are disposed on the thin film to form the offset arrays, has a length not less than 3 times as long as a diameter of the aperture discharging the droplet.

* * * * *